United States Patent Office 2,789,313
Patented Apr. 23, 1957

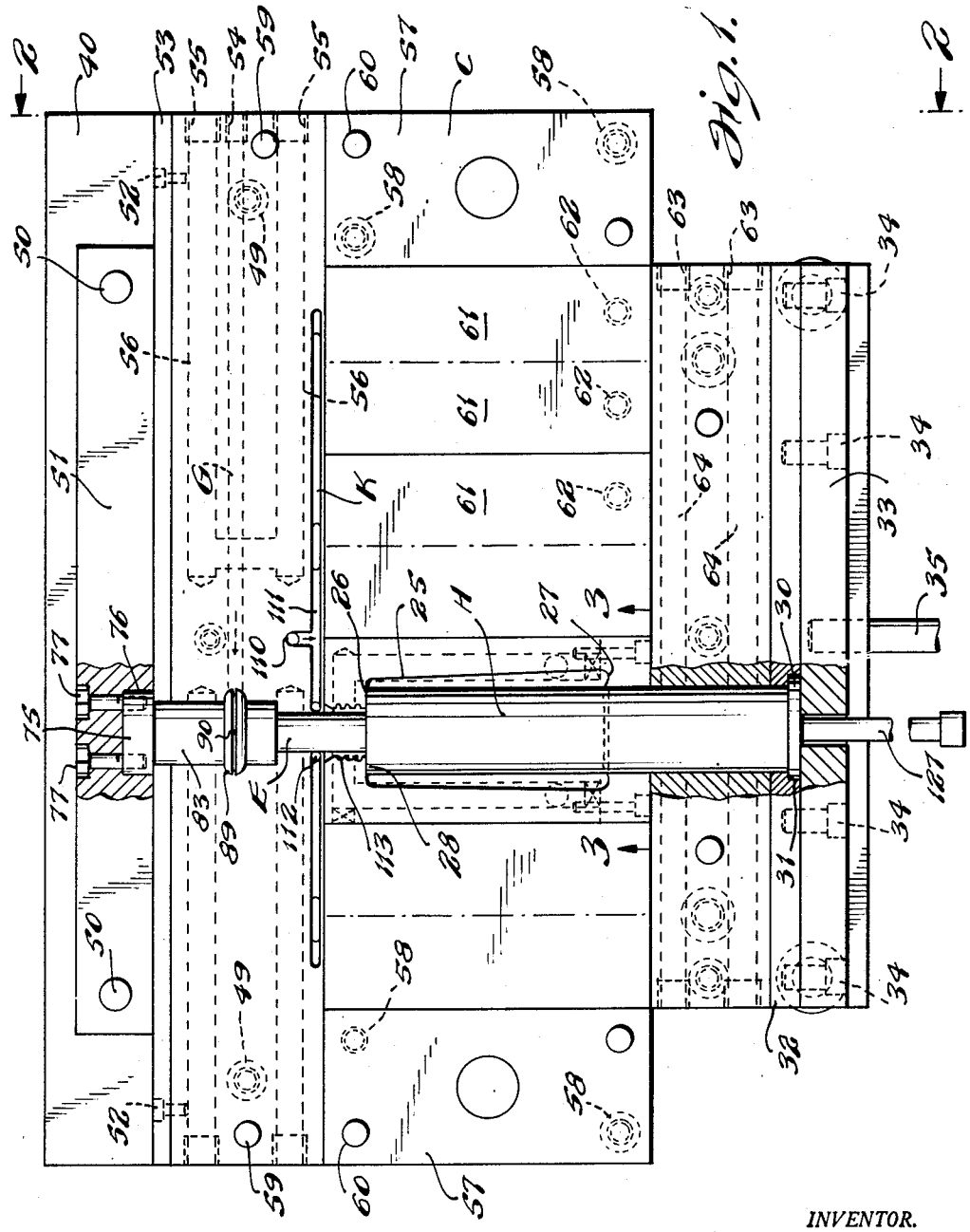

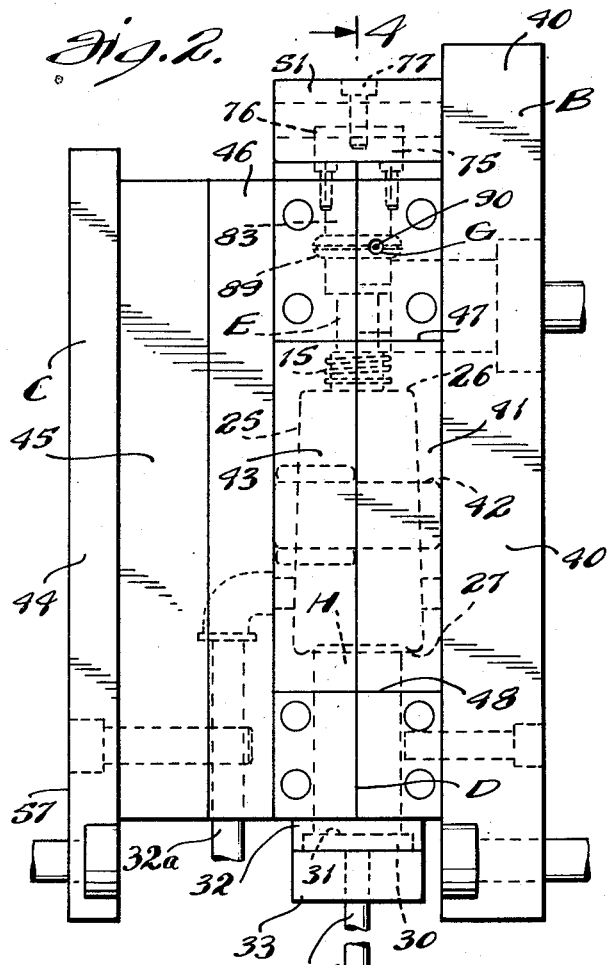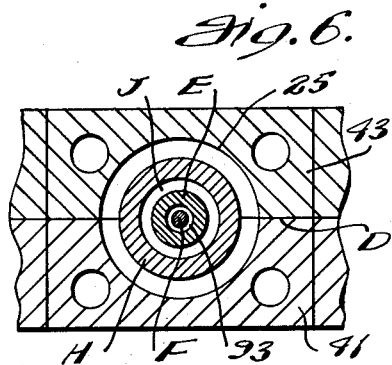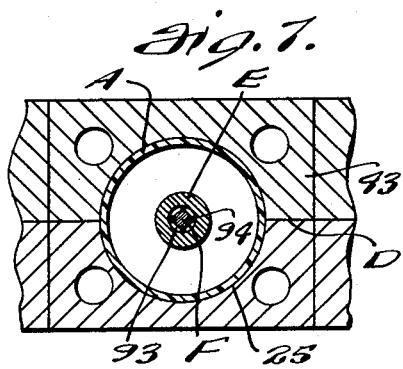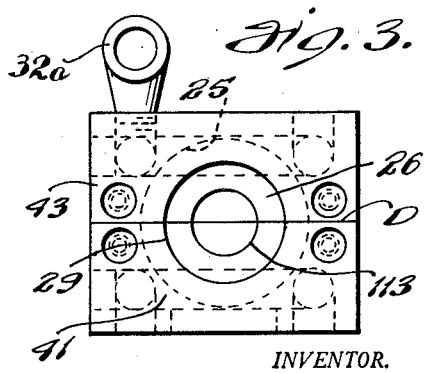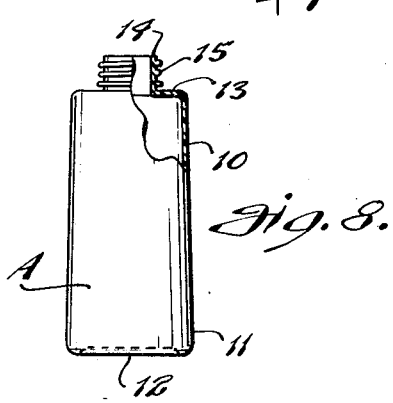
INVENTOR.
EDWARD R. KNOWLES

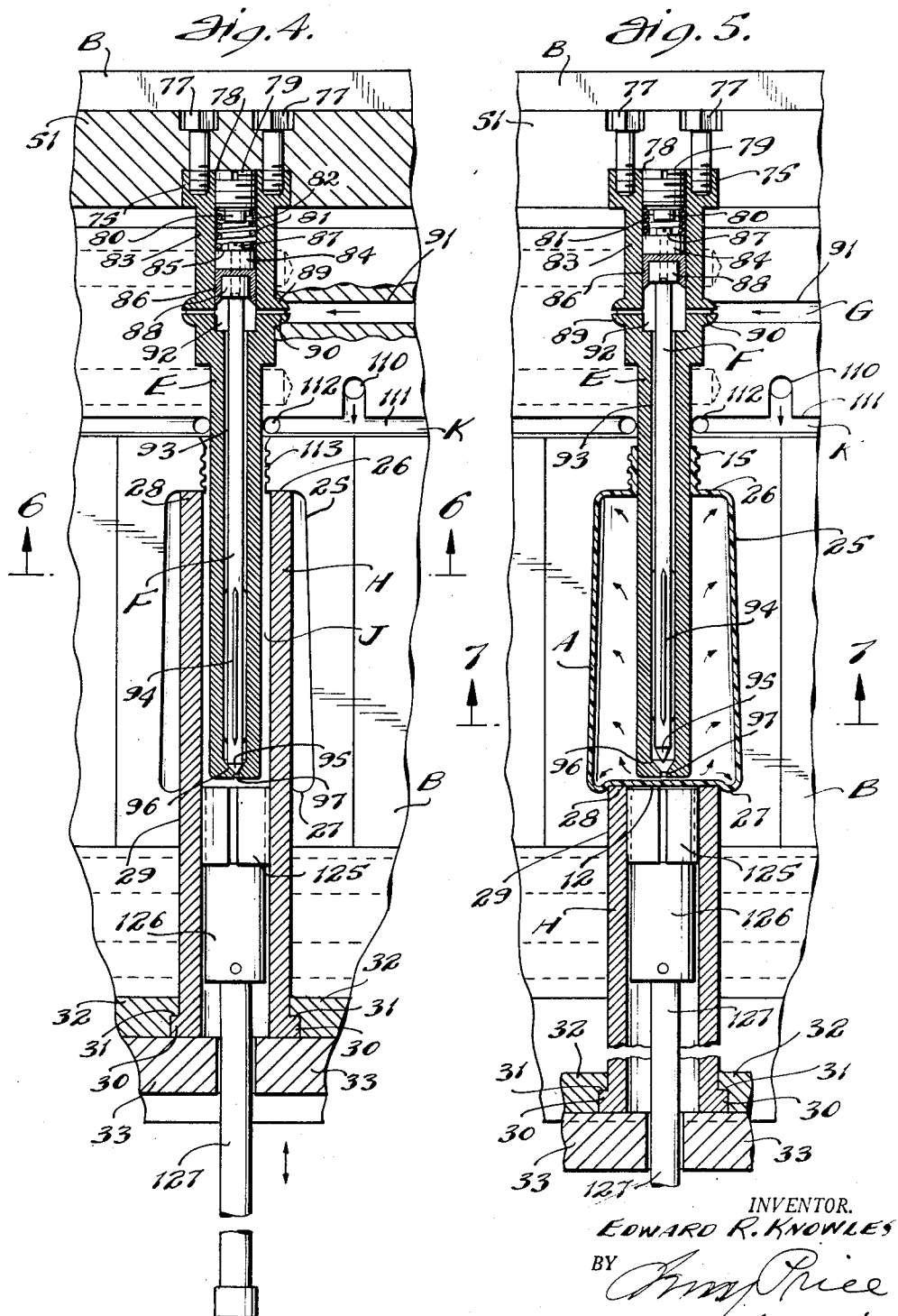

2,789,313

PLASTIC BOTTLE MOLDING MACHINE

Edward R. Knowles, Elizabeth, N. J., assignor to Lapin Products, Inc., Newark, N. J., a corporation of New York Application April 28, 1952, Serial No. 284,725

3 Claims. (Cl. 18—5)

The present invention relates to a process and method for molding containers of plastic materials, and it particularly relates to a process and method for molding bottles.

Although not restricted thereto, the present invention will be particularly described in its application to a mechanism and machinery for molding plastic flexible bottles of the type having a screw neck connection and a collapsible plastic container or cylindrical portion.

It is among the objects of the present invention to provide a novel process and mechanism for molding bottles and other containers at relatively high production and at low cost by simple injection molding procedures without the need of special manipulations, and all in one operation, together with the neck of the bottle.

Another object is to provide a high rate, low cost, mass production molding procedure for bottles of plastic materials which will eliminate the necessity of cutting off and utilizing special size blobs of plastic materials which are to be blown into shape and which will also eliminate the necessity of such manipulations as would be required when the bottles are formed from extruded tubing.

A further object is to provide a molding procedure and mechanism for making containers which will eliminate the necessity of separate extrusion of cylindrical or tubular material which must then be subsequently shaped and which will produce the finished bottle and desirable wall thickness and neck size and shape by the cycle of an injection molding machine.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects is has been found most satisfactory, according to one embodiment of the present invention, to provide a multi-cavity mold in which the opposite halves of the cavity or mold sections will be provided with recesses to receive the molten plastic which may be measured, heated to fluid or liquid condition and then forced into the mold recess under piston pressure.

The mold recess is desirably shaped so as to form the neck of the bottle and a cylindrical tubular extension thereof having a bottom closure.

This is done by forcing the fluid plastic material into a cylindrical recess having a removable core.

The recess is normally formed by a sleeve or shell pin which, after the initial shot of resin has been forced into position, may be withdrawn. This sleeve or shell pin when withdrawn will permit the resin to expand under fluid pressure to the desired bottle or container size. The inside core or pin is desirably provided with means operative after the withdrawal of sleeve or shell pin to force fluid such as air under pressure inside of the still plastic cylinder of resin which has been forced into the initial cavity.

This fluid or air under pressure will then expand the container until it has a size and shape of the outside cavity which has been under-covered by removal of the sleeve or shell pin.

In short, the cavity of the mold has an inside removable core and an outside removable shell pin spaced from one another to form an initial tube or cylinder of plastic as a result of injection molding.

This tube is then subsequently expanded to the desired container size after removal of the shell pin or sleeve by a fluid inserted through the inside core or pin.

Then the mold may be opened and the bottles removed, attached to the inside core pin and upon removal of the core pin the bottles are in final finished shape without subsequent blowing or forming operations.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side elevational view of one complete mold partly in section showing the core pin and sleeve or shell pin both in position ready to receive a shot of plastic material from the plunger of the injection molding machine.

Fig. 2 is a side elevational view of the outside of the closed mold structure upon the line 2—2 of Fig. 1.

Fig. 3 is a fragmentary transverse sectional view upon the line 3—3 of Fig. 1 showing the end of a closed cavity in the mold structure of Figs. 1 and 2.

Fig. 4 is a transverse vertical sectional view upon the line 4—4 of Fig. 2 upon an enlarged scale as compared to Fig. 2.

Fig. 5 is the same view as Fig. 4 but with the shell pin removed and with the container enlarged to the shape of the final cavity.

Fig. 6 is a fragmentary transverse sectional view upon the line 6—6 of Fig. 4.

Fig. 7 is a fragmentary transverse horizontal sectional view upon the line 7—7 of Fig. 5 showing the container enlarged to its final shape.

Fig. 8 is a side elevational view showing the final container partly in section to show the wall thickness.

In Fig. 8 there is shown a bottle A which is merely a typical shape of container which may be produced at low cost and at maximum production by the present invention.

The container A as shown has a cylindrical side wall 10 of slightly increased diameter toward its base as indicated at 11, with a slightly elevated or indented bottom 12.

The top of the bottle A has a shoulder 13 and a small diameter neck 14 which may be provided with a screw thread 15.

The bottle A may be section molded of polystyrene, cellulose acetate, polyethylene, nylon, cellulose butyrate, methyl methacrylate and other suitable plastic molding materials.

The entire mold or cavity, as best shown in Fig. 2, is made of two sections, B and C, which are shown as close together along the parting line D as indicated in Figs. 1 and 2.

The mold when closed before injection of the liquid plastic material receives the core pin or mandrel E, having a central air valving arrangement F supplied from the air passages G.

It also has a removable shell pin or cylindrical shell or sleeve H. This sleeve H may be manually or automatically withdrawn.

Normally the shell pin may be removed or inserted from the lower part of the mold while the core pin E may be removed or inserted from the upper part of the mold.

When both the shell pin H and the core pin E are in position they will form a recess J in which the plastic material may be initially inserted through the feed system K. The recess J is the space between the core pin E and the shell pin H when the shell pin is closed around the core pin, as indicated in Fig. 6.

Referring particularly to Figs. 4 and 5 the mold sections C and B are provided with the recesses 25 which are slightly conical shape as best shown in Figs. 1 and 4. These recesses terminate at 26 and 27.

Fitting within the recess before the shot of plastic material is the shell pin H the end 28 of which abuts the end 26 of the recess 25.

The shell pin slides in the opening 29 in the mold structure B and its end is provided with an enlargement or shoulder 30 which fits in the recess 31 in the drawn-out plate bar or bushing top pad 32. The plate or bar 32 is mounted to move on the bushing bottom pad 33 by means of the bolts or screws 34 (see also Fig. 1).

In Fig. 4 the shell pin H is shown in its innermost position while in Fig. 5 it is shown in its outdrawing position. The movement of the shell pin H is controlled by means of the plunger rod 35 (see Fig. 1) which will control the movement of the pads 32 and 33.

Referring to the mold structure as shown upon Fig. 2, the top plate 40 carries a chase 41 which receives the leader pin 42. This leader pin engages the bushing 43. The bottom plate 44 of the mold sections C as shown in Fig. 2 is attached to the center plate 45 which in turn is connected to the inside plate 46.

The chase 41 may be divided in sections along the parting lines 47 and 48 as shown in Fig. 2.

In the mold shown in Fig. 1 the screws 49 and the pin opening 50 are indicated but they have no bearing on the invention.

The back bar 51 will be positioned at the top of the mold and will carry the core pins E. The screws 52 will hold the plate 53 in position.

The air connection to the air conduit system G may be made at the threaded opening 54 while a water connection may be made at the threaded connections 55 leading to the passageways 56. The end chase elements 57 may be held in position by the screws or bolts 58.

Dowel pin openings are also provided at 59 and 60 to assure proper alignment. The cavity inserts 61 and screws 62 are conventional elements constituting no part of the present invention.

The lower part of the mold is provided with water connections as indicated at 63 and passages 64. The core pin E has a head 75 which fits in the recess 76 in the bar 51. This head is held in position by the screws or bolts 77.

The head 75 is provided with an opening 78 which receives the adjustable screw plug 79. The screw plug has a knob 80 which centers the coil spring 81 and adjusts the pressure thereon. The coil spring fits in the recess 82 in the upper part 83 of the core pin E.

The spring 81 reacts upon the head 84 of the piston 85. The piston 85 has a packing cup 86 held in position by the screw 87. Inside of the cup is the head 88 of the valve rod F. The portion 93 of the core pin E has a peripheral enlargement 89 having the radial passages 90 therein which communicate with the air passageway 91.

The air will pass from the air passageway 91 into the space 92 under the piston 85 and then into the narrow channel or passageway 93 between the core pin E and the inside valve rod F.

The inside valve rod F at its lower end has a plurality of guide fins 94 which ride on the inside face of the passageway within the core pin E.

The lower end of the rod F has a conical valve face 95 which is conformed to fit against the valve seat 96 and prevent passage of air through the passageway 93 and out through the small opening 97 at the bottom of the core pin E.

When, however, the valve rod F is lifted, as shown in Fig. 5, the air may then flow out through the small opening 97 into the space outside of the core pin E and inside of the cavity 25.

However, air will only be applied under pressure through the system G and the passageway 91 when the shell pin H is withdrawn into the position shown in Fig. 5.

The plastic material which is fed into the cavity J when the mold is in the position as shown in Fig. 4 will enter through the sprue or inlet 110 and through the runner passageway 111 to the ring gate 112 forming part of the passageway system K.

This plastic material under pressure will enter around the core pin E and will fill in the space 113 forming the neck 15 of the bottle A and will flow into the opening J forming the initial tubular form.

In operation, the mold sections B and C will first be closed as shown in Figs. 1 and 2 with the shell pin H and the core pin E in position as shown in Fig. 4. In this position the valve rod F will be pressed downwardly by the spring 81 so as to close its conical face 95 against the conical valve seat 96 closing off the small passageway 97.

In this position the air pressure will be cut off from the inlet G and the passageway 91 and the plastic material will be forced into the mold under pressure through the sprue 110, the runner 111 and the gate 112 into the space at 113 and at J in Fig. 4.

When the fluid plastic material has filled this space the shell pin H will be withdrawn by operation of the pads 32 and 33 to the position shown in Fig. 5 with its upper edge 28, however, being slightly above the bottom of the cavity as indicated at 27 in Fig. 5.

Then air pressure will be applied through the passageway system G and 91 where it will enter the space 92 through the openings 90. This will cause the piston 85 to be pressed upwardly compressing the spring as shown in Fig. 5 and opening the valve 95 and permitting air to flow out through the small opening 97. This will expand the plastic tube in the opening J to the final size or shape of the bottle as indicated at A in Figs. 5 and 8.

There is shown in Figs. 4 and 5 an insert or plug or plunger 125 which is carried by the member 126 and the rod 127. This plug will normally be in top position when the plastic material is originally forced into position in the arrangement shown in Fig. 5.

When, however, the shell pins H are lowered to the position shown in Fig. 5 the plug 125 will be slightly lowered so as to enable the bottom 12 to be pressed away from the opening 97 and to permit flow of air under pressure to permit expansion of the side walls of the bottle as indicated in Fig. 5.

It is thus apparent that the applicant has provided an economical high production injection mold process for molding plastic bottles or containers which may be utilized to produce such containers in finished form in one operation.

When the bottles have been expanded to the shape as shown in Fig. 5, the two mold sections B and C may be opened and the bottles carried by the core pins E may be removed and subsequently removed from such core pins.

Another set of core pins on the bar 51 may be then placed in position and the molding operation repeated first by the step of forming the small cylindrical element in the recess J in Fig. 6 followed by air pressure expansion in Fig. 5. The outlet 32a is an air relief outlet from the molding recess.

This process and molding arrangement permits complete production of the bottles without handling or intermediate operations involving extrusion of a tube, cutting of the tube, and then expansion of the tube into bottle shape. It is not necessary to handle any particularly weighed blobs of plastic materials and the recess J will automatically measure off the right amount of plastic material without complicated weighing or metering apparatus.

As many changes could be made in the above method and apparatus for molding plastic bottles, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a plastic bottle injection molding machine for making a bottle having a relatively narrow neck and cap receiving portion and a relatively wide lower container portion, a two-piece mold forming a cavity which forms the external shape of said bottle, a core pin projecting axially downwardly into said cavity, said core pin having a central axial passageway and an upper portion above said cavity with a peripheral ridged bead having a plurality of radial inlet passageways to said axial passageway to receive air under pressure, an outlet opening at the bottom of said core pin, a reciprocating conical valve at the lower end of said pin passageway to seal said outlet, an elongated valve rod extending through said passageway to said conical valve, reciprocating means to reciprocate said rod and valve, and a withdrawable cylindrical shell pin inserted within said cavity and positioned concentrically around said core pin to form an initial annular recess between the shell pin and core pin, which recess is initially filled with plastic and said shell pin being withdrawn to permit said plastic to be expanded to the shape of the cavity.

2. The machine of claim 1, the upper portion of said core pin having an enlarged pressure chamber communicating with said radial inlet passageways and said axial passageways and receiving said reciprocating means.

3. The molding machine of claim 1, in which said reciprocating means consists of a coil spring returned piston which is actuated by the air under pressure passing inwardly through said radial inlet passageways.

References Cited in the file of this patent
UNITED STATES PATENTS
2,469,130    Rodman _____ May 3, 1949